United States Patent [19]
Graham

[11] 3,975,854
[45] Aug. 24, 1976

[54] AUTOMATIC FISHING MACHINE

[76] Inventor: Robert R. Graham, 2228 Central Ave., Spring Valley, Calif. 92077

[22] Filed: Apr. 28, 1975

[21] Appl. No.: 572,120

[52] U.S. Cl................................. 43/6.5; 43/19.2
[51] Int. Cl.²......................................... A01K 79/00
[58] Field of Search.......................... 43/6.5, 4, 19.2

[56] References Cited
UNITED STATES PATENTS

| | | | |
|---|---|---|---|
| 3,550,302 | 12/1970 | Creviston et al................ | 43/19.2 X |
| 3,710,499 | 1/1973 | Tadano................................. | 43/6.5 |
| 3,813,806 | 6/1974 | Nishida et al........................... | 43/15 |
| 3,839,810 | 10/1974 | Lagasse................................. | 43/19.2 |
| 3,863,379 | 2/1975 | Kobayashi............................. | 43/6.5 |

*Primary Examiner*—Russell R. Kinsey
*Assistant Examiner*—Daniel J. Leach
*Attorney, Agent, or Firm*—Frank D. Gilliam

[57] ABSTRACT

A fishing machine mounted on the side rail of a boat for automatically catching and boating fish. A rigid bracket is attached to the boat. The bracket has a base plate pivotally mounted thereon. A stator of a rotary actuator is attached to the base plate with its rotor supporting a hollow elongated fishing pole extending away from the boat to a fishing position over the water adjacent the outer deck periphery of the boat. A self-reciprocating hydraulic cylinder is attached between the bracket and the base plate to provide horizontal oscillational movement to the fishing pole. A fishing line with a fish catching lure at one end positioned below the surface of the water passes through the hollow fishing pole and its other end is attached to the control for the rotary actuator. Whn the weight of a fish is transmitted via the line to the rotary actuator control, the actuator rotor rotates in a manner to elevate the pole tip to a position over the deck of the boat. When the weight of the fish is no longer transmitted to the control, the rotor rotates in the opposite direction until the pole is again in its outboard fishing position. An additional control is provided to vertically oscillate the tip of the pole while in the fishing position in the absence of an attached fish.

11 Claims, 6 Drawing Figures

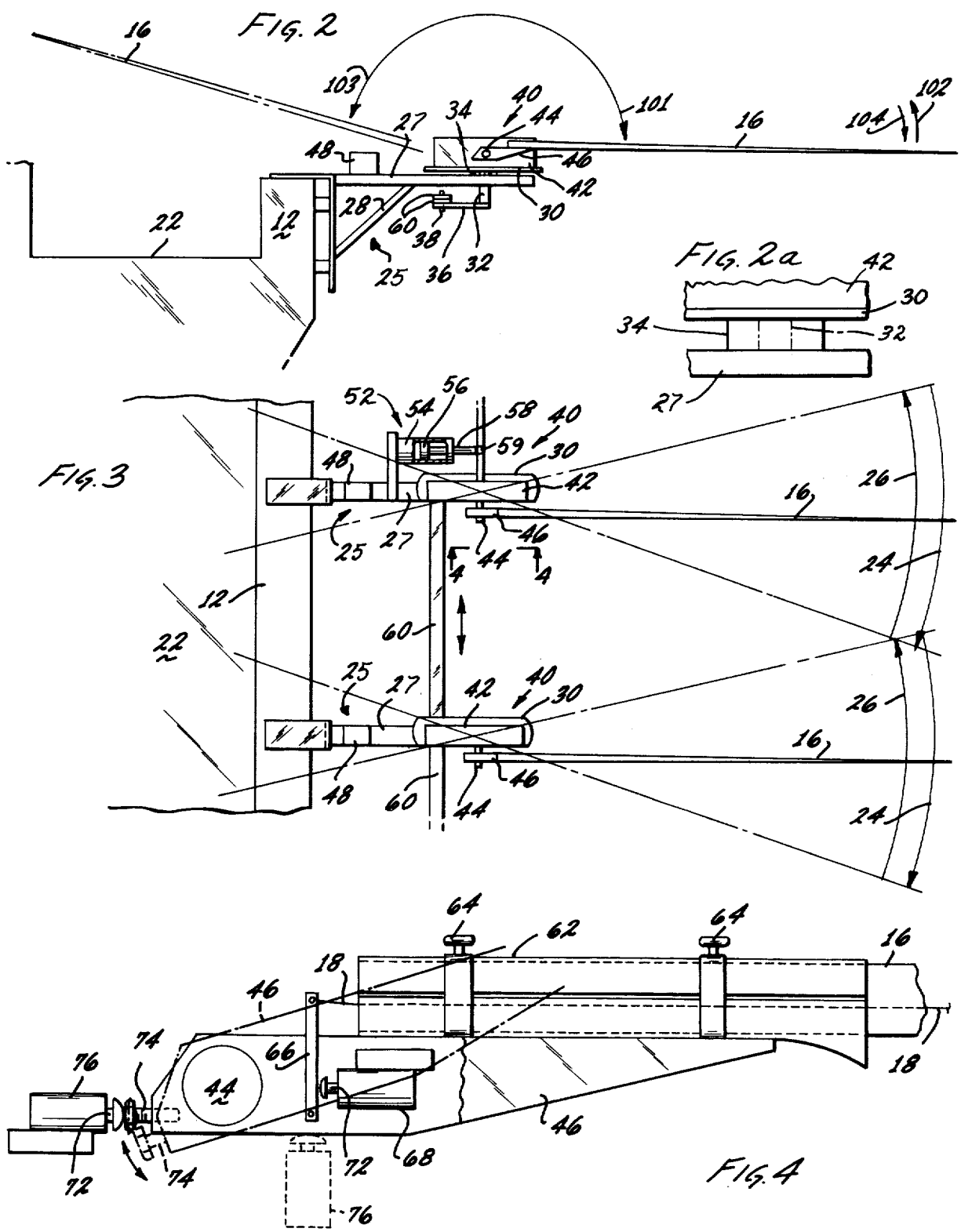

3,975,854

1

AUTOMATIC FISHING MACHINE

BACKGROUND OF THE INVENTION

The present invention relates to fish catching equipment and more specifically to an automatic fish catching machine for depositing caught fish on the deck of a boat.

A considerable number of different automatic fish catching machine of this general type presently exist. The existing machines, however, are found to have various deficiencies preventing optimum fish catching capabilities.

The presently available fish catching machines are almost without exception expensive to construct in that they are comprised of a plurality of combined complex and sensitive operating mechanisms such as servo motors, pumps, etc. The complexity and number of operating parts further require that an extensive inventory of spare parts be maintained to provide repairs in the event of operating failure. In addition, because of their complexity, failures result in excessive non-operable time while repairs and adjustments are performed.

These presently available fish catching machines constitute a safety hazard in that in their normal operation, they require hydraulic pressures in the neighborhood or in excess of 3,000 pounds per square inch.

None of the presently available fish catching machines provide horizontal oscillation to the pole tip when the pole is in its fish catching position.

These and various other problems were not satisfactorily resolved until the emergence of the instant invention.

SUMMARY OF THE INVENTION

In accordance with the present invention, there is provided an improved automatic machine for catching and boating fish that is low in construction cost, has very few moving parts, these parts being commercially obtainable, and rugged in construction, operates from relatively low hydraulic pressure source thereby removing all of the presently existing safety problems of the present devices, has considerable less non-operable down time due to ease of repair and readily available replacement parts and provides a simple positive method of horizontally and vertically oscillating the pole tip simultaneously for attracting fish.

The novel features which are considered as characteristic of the invention are set forth with particularity in the appended claims. The invention itself, however, as to its construction and obvious advantages will be best understood from the following description of the specific embodiment when read with the accompanying drawings.

BRIEF DESCRIPTION OF THE DRAWINGS

FIG. 2 is a side view of the fishing machine attached to a boat rail.

FIG. 2a is an enlarged side view of a portion of FIG. 2 showing the mounting bracket of the fishing machine in greater detail.

FIG. 3 is a plan view of two of the fishing machines coupled together for interaction.

FIG. 4 is a view of the portion 4—4 of FIG. 3.

DETAILED DESCRIPTION OF THE PREFERRED EMBODIMENTS OF THE INVENTION

Figure 1:
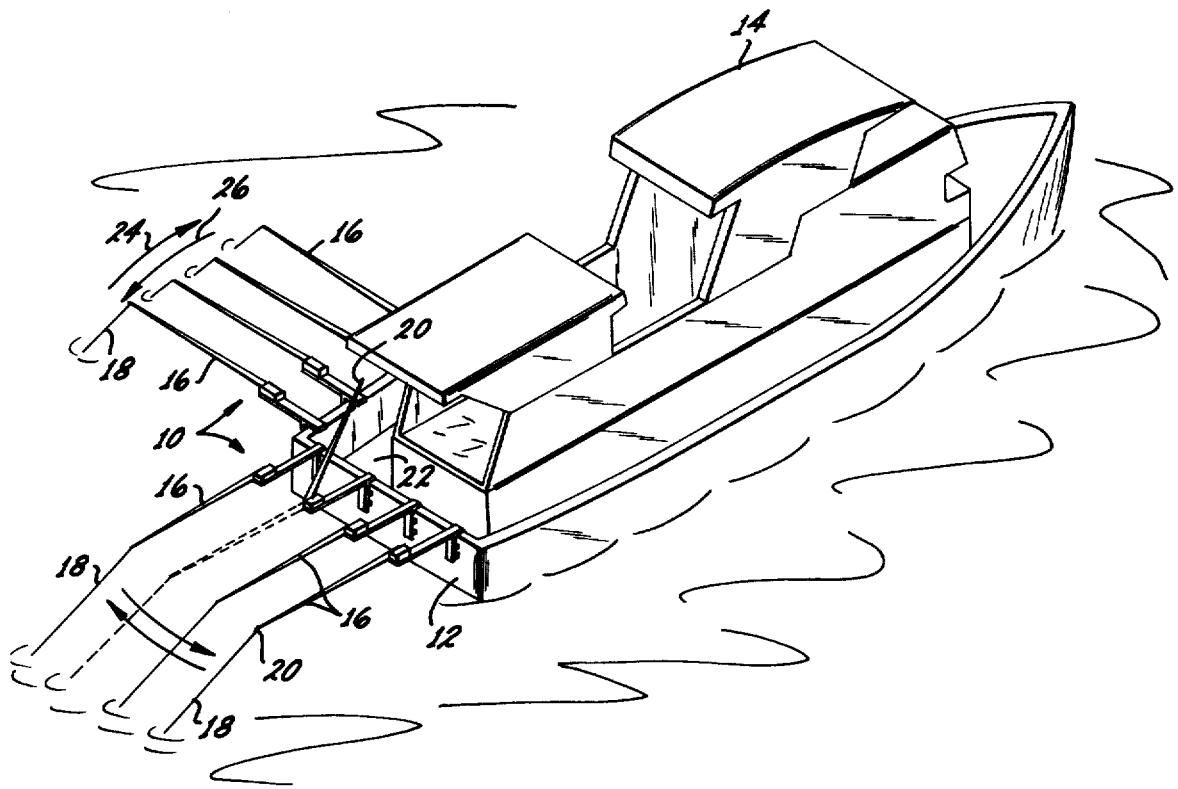
FIG. 1 is a perspective, illustrative view of a boat with a plurality of fishing machines attached to the side and stern rails.

The same reference numerals are used throughout the various drawings and specification to denote a similar item of the invention.

FIG. 1 shows a perspective view of a plurality of fishing machines 10 mounted to the rails 12 of the boat 14. The fishing poles 16 are shown in their relative side by side fishing positions with lines 18 having their fish catching lure (not shown) below the water surface in a fish catching position. One fishing pole 16 is shown in its standby or fish decking position with tip 20 positioned over the deck 22 of the boat 14. The poles tips are shown oscillating from side to side in the direction of arrows 24, 26.

Referring now specifically to FIG. 2, a mounting bracket 25 attached to the rail for supporting the operating mechanism of the fishing machine is shown. It can be seen that the machine of the instant invention would operate equally as well if they were attached to the boat deck rather than the rail. The bracket 25 may be attached to the boat by any convenient attaching means. The bracket has an extended portion 27 supported by a brace 28. Near the outer end of portion 27 remote from the rail a pivotal base plate 30 is provided. The base plate may be constructed from any suitable material such as steel or any other material having similar strength characteristics. The base plate has a pivot pin 32 attached thereto that passes through portion 27 of the mounting bracket. A collar or enlarged portion 34 rides on the upper surface of portion 27. A slide bar arm 36 is fixedly attached to the lower end of pivot pin 32. A slide bar pivot pin 38 is carried by the slide bar arm 36 as shown. The purpose of the slide bar arm 36 and its associated pivot pin will be hereinafter discussed.

Figure 5:
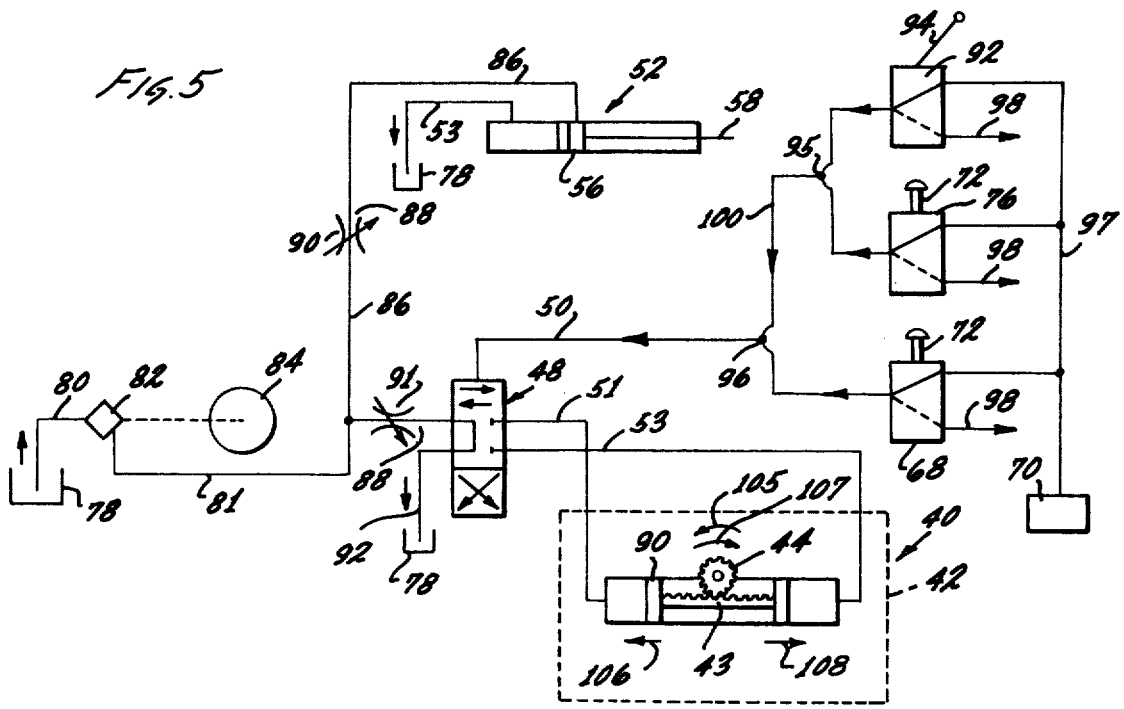
FIG. 5 is a schematic view of the control for the fishing machine.

A rotary actuator 40 has its external stator or housing 42 fixedly mounted to the base plate by any convenient means. A rotor 44 is positioned within the stator 42 with a rotatable shaft extending through and beyond the stator side wall and is supported thereby. An extending arm 46 is fixedly attached near one of its ends to the rotor shaft, and rotates therewith. The extending arm 46 has an upper surface substantially parallel to the upper surface of the stator 42 when the rotor is in its fish catching position as shown in this figure and FIG. 4. The rotary actuator 40 may be of the single or double cylinder/piston type having an internal rack and pinion (as shown in FIG. 5), a rotary valve type or any similarly operating device known in the mechanical art capable of performing a similar function. The actuator 40 of the preferred embodiment is adjusted to rotate clockwise or counterclockwise substantially through a 180° arc.

A hollow fishing pole 16 is fixedly attached as shown providing an extension of arm 46. The pole extends beyond the deck of the boat when in its normal fish catching position as seen in the various figures. The pole of the preferred embodiment is constructed of fiberglass. Any similar material may be used. The only specific requirements of the pole are that it is hollow and have the strength required to lift the weight of the type of fish that the fishing machine is designed to catch from below the water surface to the deck of the boat.

An externally controlled air piloted directional valve 48 is operably connected to the rotary actuator 40 so as to control both directions of the rotation of the actuator rotor 44. The directional valve of the preferred embodiment is an air piloted control valve well known in the hydraulic art. The type of directional control required depends on the type of rotary actuator to be controlled. The purpose and operation of the directional valve will hereinafter be discussed.

Referring now specifically to FIG. 3, attached between the bracket portion 27 of mounting means 25 and the base plate 30 is a linear actuator 52 of the self-reciprocating type. The linear actuator of the preferred embodiment is a hydraulically operated cylinder/piston combination 54, 56 respectively. Any type of self-reciprocating linear actuating device may be used to practice the invention. The only requirement being self-reciprocation and sufficient strength to operate with the weight of a fish attached to the pole. The connecting rod 58 attached to piston 56 is pivotally attached to an extension 59 of the base plate 30 while the cylinder is fixedly attached to an extension 61 of the bracket 27. The cylinder/piston could be connected in an opposite manner and perform its function equally as well.

Slide bars 60 are pivotally connected between the pivot pins 38 at the free end of each slide bar arm 36. As can be seen from the last mentioned figure only one linear actuator 52 is required for each plurality of interconnected fishing machines. The slide bars 60 can be made from any suitable material and may be of varying length depending on the distance between the fishing machine placement and the distance between the adjacent machines on side and stern of the boat.

Referring now to FIG. 4, a section 4—4 of FIG. 3 is shown. A fishing pole holder 62 is fixedly mounted by any convenient means to the upper surface of arm 46. The pole holder of the preferred embodiment is of a two piece tubular structure for confining one end of the pole between the pieces by clamps 64. Any suitable holder may be used to practice the invention.

A portion of the fishing line 18 is shown attached to one end of an actuating lever 66. The lever is pivotally attached to the arm 46 at its other end. Near the arm 46 attachment portion of actuating lever 66 is an actuator valve 68 fixedly attached to the arm 46. The actuator 68 is operably connected as shown in FIG. 5. The actuator valve 68 has a spring biased operating button 72 shown in its spring biased outward valve closed position.

Positioned on the arm 46 is a member 74 (shown as a threaded screw bolt with an enlarged head). Adjacent and cooperating with the member 74 is an actuator valve 76 fixedly attached either to the base plate 30 or the stator of the rotary actuator. It can be seen that when the arm 46 is in its fishing position, indicated by arrow head 101 of FIG. 2, member 74 holds button 72 of actuator valve 76 in its depressed valve open condition. It can be further seen when arm 46 (shown in phantom) is in a raised position actuator valve 76 is in its extended spring biased closed condition.

The actuator valve 76 may be mounted on the base plate 30 below arm 46, shown in phantom in this figure. In this position, the button is depressed when the arm 46 is in its fishing position and released when the arm rises sufficiently causing the pole tip to oscillate vertically in a like manner.

A manual actuator valve 92 (see FIG. 5) is remotely positioned from the fishing machine 10 for selective manual operation.

The actuator valves 68, 76 and 92 are of the same type and are air flow control valves spring biased in the closed or no-flow condition. The purpose and operation will be hereinafter discussed.

Referring now specifically to FIG. 5, a schematic showing of the interconnection of the various components of the fishing machine 10 is shown. A hydraulic fluid storage tank 78 is connected through a high pressure fluid line 80 to a hydraulic pressure pump 82 driven by a power source 84, such as an electric motor, diesel engine or the like. The hydraulic fluid leaving the pump through line 81 has an elevated pressure in the range of 500 to 2,000 pounds per square inch. This pressure may be slightly more or less depending on the equipment operated and the weight of the fish to be caught. The volume of hydraulic fluid entering lines 86, 88 is controlled by control valves 90, 91 respectively. The air piloted directional control valve 48 is connected to line 88 and directs the hydraulic fluid under pressure selectively to either side of cylinder 90 and connects the line from the opposite end of the cylinder to line 92 for returning spent fluid to storage tank 78.

A source of pressurized air 70 is provided to supply controlled pressurized air to air piloted directional control valve 48. The air at a pressure in the range of 30–150 pounds per square inch is supplied to the input lines 97 of the actuator valves 68, 76 and 92. Each of these actuator valves is provided with an exhaust or vent line 98. As can be seen, actuator valves 76, 92 are connected in parallel to the two inputs of shuttle valve 95, and the output of shuttle valve 95 provides one input to shuttle valve 96 while the second input is provided by actuator valve 68. The shuttle valves 95, 96 are commonly available valves that allow air under pressure at either of its inputs to pass through the common output and not feed back through the other input. The valves are well known in the pneumatic art. The output of the shuttle valve 96 supplies an input to the air piloted control valve through line 50. It can be readily seen that the opening of either of the actuator valves will supply air under pressure to line 50.

OPERATION OF THE PREFERRED EMBODIMENT

When the hydraulic fluid in the line 86 supplying linear actuator 52 reaches operating pressure, the piston 56 begins to actuate back and forth rocking the base plate 30 at a speed controlled by the setting of valve 90. The length of the movement of the pole is determined by the physical placement of the linear actuator with respect to the rotary actuator. The spent or exhaust hydraulic fluid from the linear actuator is returned through hydraulic line 53 to the storage tank 78. Self-reciprocating hydraulic linear actuators and their manner of operation are well known in the art and need not be explained herein.

The hydraulic fluid entering the air piloted control valve 48 through line 88 is directed (in the case of a single cylinder rack and pinion type shown) to either end of cylinder 90 depending on which direction rotor 44 is desired to be rotated. The hydraulic line on the opposite end of the cylinder from the pressure directs the spent or exhaust fluid to the storage tank 78. The rotational direction of rotor 44 is determined by the air piloted control valve 48. The air piloted control valve 48 of the preferred embodiment is internally spring biased so as to direct hydraulic fluid under pressure from hydraulic line 88 through the valve 48 into hydraulic line 53 causing the rotor 44 to rotate to its maximum clockwise direction shown by arrow 107 by the movement of rack 43 along arrow 106 which places the lever 46 and the pole 16 in the horizontal fish catching position shown in FIG. 2 by arrow 101. The air piloted directional control valve when in its normally spring biased position, line 51 is connected through the valve 48 to line 92 for the exhausting of spent fluid as hereinbefore mentioned.

When air under pressure is supplied to the air piloted directional control valve 48 through line 50 the normal internal spring bias of the control valve is overcome by the pressure causing the valve 48 to move from its spring biased line 51 and line 53 is connected to line 92. The hydraulic fluid under pressure now forces rack 43 in the direction of arrow 108 causing the rotor to rotate in the direction of arrow 105 from its extreme clockwise arrow 107 position counterclockwise until the air supply to the valve 48 is terminated or the rotor reaches its extreme arrow 105 directional position placing the arm 46 and the pole in the phantom showing of FIG. 2 (arrow 103). When the air pressure is removed, the normally biased valve position is resumed causing the rotor 44 to rotate in the arrow 107 direction until the rotor reaches its maximum rotational position placing arm 46 and the pole in the FIG. 2 (arrow 101) position.

Fish attached to the lure are placed on the deck of the boat in the following manner. In its ready condition, the hydraulic fluid and the air are at their operating pressure; the linear actuator 52 is oscillating the machine horizontally with respect to the rail at a speed determined by the setting of valve 90, a wide open valve provides maximum oscillation speed or frequency. A closed valve ceases the oscillation; the actuator valves 68, 76 and 92 are in their normal spring biased closed position allowing no air to flow to the air piloted direction control valve 48; and the air piloted directional control valve 48 is, therefore, in its spring biased position placing arm 46 and the pole 16 in the FIG. 2 (arrow 101) fishing position as hereinbefore discussed.

When a fish strikes and is hooked to a non-barbed lure, common in the commercial fishing art, its weight is transmitted up fishing line 18 wherein lever 66 is pulled toward the tip of the pole depressing button 72 of actuator valve 68 causing the valve to allow air under pressure to flow through shuttle valve 96 through line 50 to the air input of the air piloted directional control valve 48. With air pressure now present, the air piloted directional valve allows the rack 43 to move in the arrow 108 direction causing rotor 44 to rotate counterclockwise in the direction of arrow 105 rotating the pole tip with the fish attached upward toward the boat through the arc formed between arrows 101 and 103. When the fish reaches the deck, its weight is no longer sensed at lever 66 thus causing the button 72 of actuator 68 to return to its normal spring biased closed position shutting off the air to the air piloted directional control valve. The rotor 44 of the rotary actuator now rotates again in its arrow 107 rotational direction until the pole is again returned to its fish catching position shown in FIG. 2 (arrow 101). It should be noted that because of the lack of barbs on the hook or fish holding means, the fish will normally be unhooked when he strikes the deck of the boat. In the event the fish does not become unhooked, the pole will remain at a position over the boat where the weight of the fish is transmitted to lever 66. To safely remove the fish manually, actuator valve 92 is opened to allow a new path for pressurized air by manually depressing operating lever 94. As long as the operating lever 94 is depressed, the actuator will hold the pole in its extreme counterclockwise inboard arrow 103 position (shown in phantom in FIG. 2). The releasing of the lever 94 returns the pole to its maximum clockwise arrow 101 fishing position as shown in FIG. 2. Actuator valve 92 may also be utilized for any purpose that requires the pole to be in its maximum counterclockwise inboard (phantom FIG. 2) position.

At any time when the pole is in its fishing position, the button 72 of actuator 76 will be depressed allowing pressurized air to reach the air piloted directional control valve 48 causing the pole tip to move upward along arrow 102 until the button of actuator 76 loses contact with member 74 (see phantom showing of FIG. 4) shutting off the air to the air piloted directional control valve and returning the pole tip along arrow 104 to its fishing position.

The pole tip will continue to oscillate in this manner until actuator valve 68 is again actuated by the weight of a caught fish. The speed or frequency of these vertical oscillations of pole tip movement is determined by the setting of control valve 91.

It should now be understood that the pole tip oscillates horizontally as well as vertically until a fish is caught. This movement simulates live bait on the line and is a further aid in attracting a fish. When a fish is caught, the horizontal oscillation continues as several fishing machines may operate from a single horizontal actuator (see FIG. 3).

The invention may be embodied in other specific forms without departing from the spirit or essential characteristics thereof. The present embodiments are, therefore, to be considered in all aspects as illustrative and not restrictive, the scope of the invention being indicated by the appended claims rather than by the foregoing description, and all changes which come within the meaning and range of equivalency of the claims are therefore intended to be embraced therein.

What is claimed as new and useful and desired to be secured by U.S. Letters Patent is:

1. An automatic fishing machine comprising:
   a fishing member;
   a mounting means for pivotally attaching said fishing member to a rigid support member;
   horizontal oscillating means for continually oscillating said fishing member uniformly with respect to said supporting member;
   vertical elevating means for elevating the horizontal oscillating fishing member from a fishing position responsive to the weight of a fish attached thereto and returning said member to said fishing position when the weight is removed; and
   control means for selectively elevating said fishing member in the absence of weight thereon.

2. The invention as defined in claim 1, wherein there is additionally provided a vertical oscillating means for vertically oscillating the horizontal oscillating fishing member uniformally with respect to said supporting member.

3. The invention as defined in claim 1, wherein said mounting means comprises a mounting bracket having a pivoted base member attached thereto for supporting said fishing member.

4. The invention as defined in claim 1, wherein said horizontal oscillating means is a self-reciprocating hydraulic piston and cylinder combination.

5. The invention as defined in claim 1, wherein said vertical elevating means is a rotary actuator activated in one direction by a weight activated control means.

6. The invention as defined in claim 1, wherein said additional control means is a manually operated control for selectively operating said vertical elevating means.

7. An automatic fishing apparatus for mounting on a boat comprising:
   fish catching means;
   mounting means comprising a bracket fixedly attached to said boat and a base plate pivotally attached thereto;
   vertical elevating means including an activating trigger carried by said base plate, the actuation of said elevating means being responsive to the weight of a fish attached to said fish catching means for elevating said fish catching means and that fish from a first fish catching position to a second position where said fish is deposited on the deck of said boat and returning said fish catching means to said first position;
   a manual actuated control means for selectively causing said vertical elevating means to operate in the absence of a fish attached to said fish catching means;
   horizontal oscillating means positioned between said mounting bracket and said base plate for controlled horizontal oscillation of said fish catching means with respect to said mounting bracket; and
   vertically oscillating means for vertically oscillating and fish catching means while said fish catching means oscillates horizontally said vertically oscillating means becoming inactive when said vertical elevating means is operative.

8. A system of automatic fishing apparatus comprising:
   a plurality of spaced apart fishing members;
   a horizontal oscillating means for simultaneously oscillating said fishing members; and
   a plurality of vertical elevating means, one associated with each of said plurality of spaced apart fishing members for elevating the oscillating fishing member from a fishing position responsive to the weight of a fish attached thereto and returning said fishing member to said fishing position when the weight of said fish is removed.

9. The invention as defined in claim 8, wherein said horizontal oscillating means comprises a linear actuator interconnected to said plurality of fishing members.

10. An automatic fishing machine comprising:
    a fishing member;
    a mounting means for pivotally attaching said fishing member to a rigid support member;
    vertical elevating means for elevating said fishing member from a fishing position responsive to the weight of a fish attached thereto and returning said member to said fishing position when said weight is removed; and
    control means for selectively elevating said fishing member in the absence of said weight thereon.

11. The invention as defined in claim 10, wherein there is additionally provided a vertical oscillation means for vertically oscillating said fishing member uniformly with respect to said supporting member.

* * * * *